May 3, 1938.  S. J. PHILIPSON  2,116,411
ADVERTISING DEVICE
Filed Jan. 21, 1938
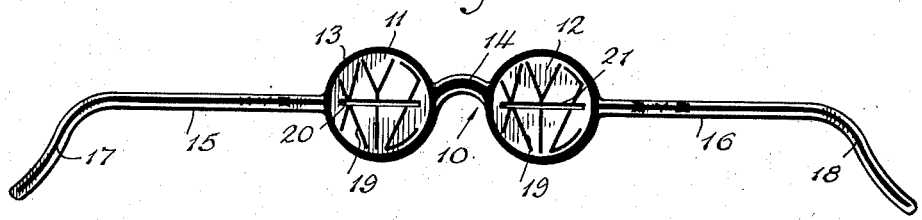
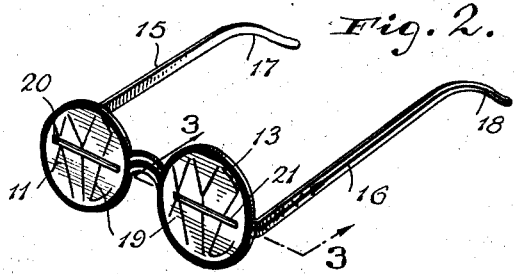
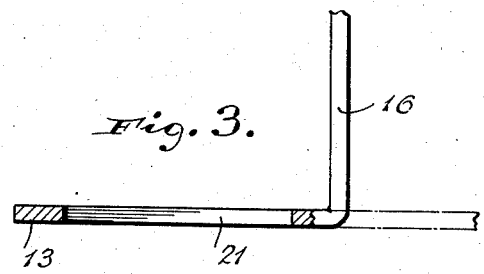
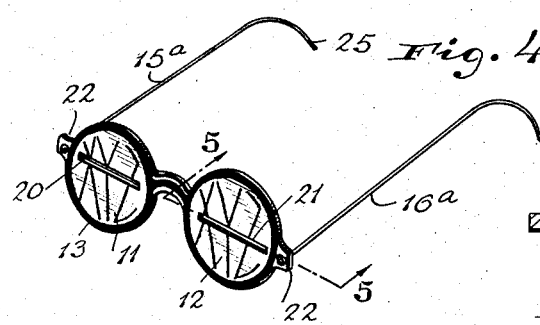
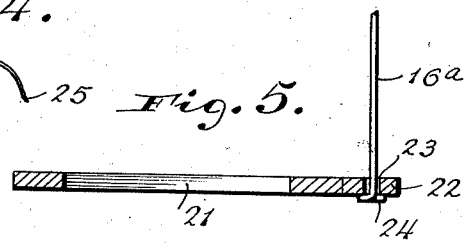
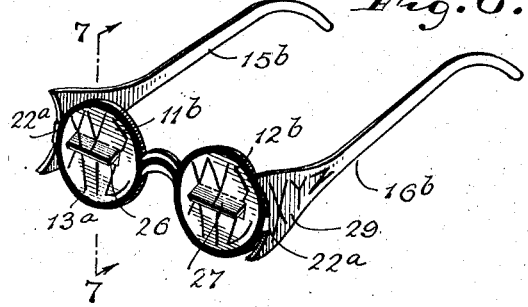
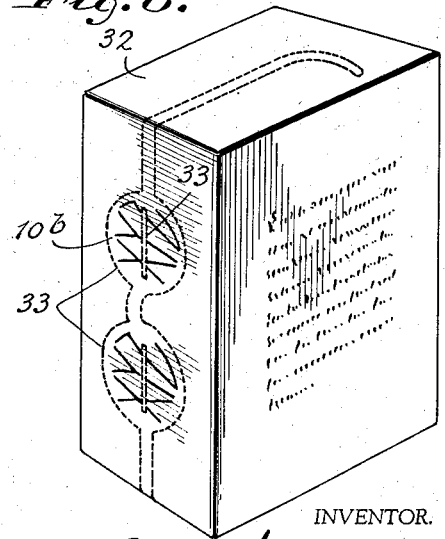
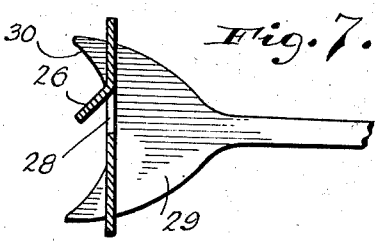
INVENTOR.
STANLEY J. PHILIPSON
BY
his ATTORNEY.

Patented May 3, 1938

2,116,411

UNITED STATES PATENT OFFICE 2,116,411

ADVERTISING DEVICE

Stanley J. Philipson, Forest Hills, Long Island, N. Y.

Application January 21, 1938, Serial No. 186,030

6 Claims. (Cl. 40—126)

This invention relates to printed matter; more particularly to an advertising device in which printed matter is displayed and simultaneously forms an article of utility.

It is an object of my invention to provide a highly attractive advertising device in which printed matter and graphic representations are displayed in a highly conspicuous manner, while providing a simple and inexpensive device which has attractive utility.

My invention is predicated upon the observation that an unusual alteration of the most conspicuous part of one's countenance attracts considerable attention and, accordingly, it is an object of my invention to associate with the eyes, means for mounting advertising matter.

It is contemplated by me to provide an advertising device which simultaneously serves as an inexpensive item of utility in that advertising matter may be impressed upon, or associated with, eyeglasses or goggles. The limitation of such areas as may be presented in eyeglasses or goggles has especially involved the problem of devoting as much space as possible on such article as eyeglasses or goggles to the display of advertising matter, without interfering with the vision to any material extent.

Accordingly, I have provided an advertising device in the form of eyeglasses or goggles in which eye covering portions are substantially completely covered with impressed advertising matter, while associating with these eye covering sections, apertures of such size and shape as do not materially obliterate the printed matter, while providing effective screens or shields to reduce the glare of light.

It is therefore further an object of my invention to provide an advertising device worn in the nature of glasses or goggles in which the eye covering portions are representative of lenses and over which the maximum amount of impressed matter may be displayed and including therewith limited apertures which do not interfere with the display area, while providing a light obscuring and shielding effect.

In other respects, it is an object of my invention to provide a highly effective advertising device which has combined therewith elements of utility for purposes of use as sun shields.

To attain these objects and such further objects as may appear herein or be hereinafter pointed out, I make reference to the accompanying drawing, forming a part hereof, in which—

Figure 1 is a plan view of one embodiment of my invention;

Figure 2 is a perspective view thereof;

Figure 3 is a fragmentary section taken on the line 3—3 of Figure 2;

Figure 4 is a perspective view of another embodiment of my invention;

Figure 5 is a section taken on the line 5—5 of Figure 4;

Figure 6 is a perspective view of a still further embodiment of my invention;

Figure 7 is a fragmentary section taken on the line 7—7 of Figure 6;

Figure 8 is a perspective view of another embodiment of my invention.

Making reference to the drawing, in one embodiment of my invention I have illustrated the same in the form of a pair of goggles 10, made from sheeted material, such as cardboard, and which includes a pair of simulated lenses 11 and 12, having impressed thereon an eyeglass frame 13, joined together by a representation of a nose bridge 14. Strips 15 and 16 are joined to the simulated frame 13 and extend to each side thereof. These strips are formed to simulate riders having ear engaging offsets 17 and 18.

Within the bounds of the simulated frame 13, the areas 11 and 12 are impressed with printing ink or the like to give the impression of the glass used in lenses and also with graphic subject-matter 19, covering substantially the entire area of the lens-like areas 11 and 12.

In order not to obliterate the areas 11 and 12 and in order to provide viewing apertures, I provide slots 20 and 21, extending substantially diametrically across the areas 11 and 12. These slits provide the viewing apertures through which the eye may scan a very wide area horizontally, while effectively shielding the eyes from the glare of the sun or the reflection which may be thrown upon the eye from the ground.

Thus, the device may be worn during the progress of a baseball game or at the beach, or at other places where people may congregate out of doors, and the device will serve as a medium for displaying the impressed advertising matter, while affording the utility of sun shields, goggles or the like.

It will also be observed that the most conspicuous area corresponding to the eye covering matter may have impressed thereon printed matter for advertising purposes, and that the association therewith of the slit does not interfere with the display area on the simulated goggles or eye glasses.

In Figure 4 I have illustrated another embodiment of my invention which, in all respects, may follow the embodiment already described as to the main display areas simulating the lenses 11 and 12 and the frame 13. In this construction, also, the impressed subject matter 19 may cover substantially the entire area of the lens defining areas within the frame 13 and also include the apertures 20 and 21, of the character which does not interfere with the display area.

In this construction, however, riders 15a and 16a are made of wire, one end whereof passes through the extensions 22 of the frame, through orifices 23, one end of the riders being enlarged by a knot or loop 24, to hold the riders against displacement. The free ends 25 may thereupon be shaped to affix the riders around the ears of the wearer, as will be readily understood.

In Figures 6 and 7, there has been described another embodiment of my invention wherein a frame 13a has the display area 11b and 12b shaped to simulate eyeglass frames. On the face of the areas 11b and 12b, advertising matter may be impressed for the full area, and thereafter visor-like elements 26 and 27 may be cut out therefrom, leaving apertures 28.

These apertures may be effective for the purposes already mentioned, without interfering with the display area as the impressed advertising subject matter will be substantially continuous over the lens-like areas 11b and 12b.

In this form of construction, as in the embodiment already described, the material from which the device is formed may comprise relatively stiff cardboard of one or two ply construction, so that the device may be maintained on the bridge of the nose and spaced from the eyelids.

The device is readily amenable to the usual printing operations or sheets of this paper may be printed with the configuration desired, pasted to cheaper cardboard and then stamped out by dies of the contour desired.

In Figures 6 and 7, cardboard material such as that described in connection with the previous embodiments is employed. However, in this form of construction, extensions 22a connect riders 15b and 16b, made integral with the frame 13a. The portions 15b and 16b are widened to provide the blinder sections 29. By forming the embodiment illustrated in Figures 6 and 7 from one section, the severing cut which defines the edges of the frame 13a will also outline the curvilinear portion 30 of the riders, to form the blinders 29 already described. Thus by leaving the extensions 22a, the riders may be left connected to the frames, while providing effective blinders.

In this form of construction, the blinders being of extended area, there may be also impressed thereon additional advertising matter 31, extending the effective display area of the device contemplated by me.

In Figure 8 I have illustrated another embodiment of my invention, wherein a package or carton 32 is shown. Printed upon the outer surface of this package, there is outlined the goggle-shaped device 10b. Perforations or score lines 33 outline the device, which is otherwise integral with the sheeting material from which the carton or package 32 is made. The carton may be otherwise impressed with the advertising matter appearing on such articles. When such a package is sold, the wrapping material or cardboard includes outlined thereon my device, already described, and of the general form illustrated in Figure 1.

The score lines or perforations 33 permit of a ready severance of this device from the sheeting material of which the package is made. Thus, the printing operation which is usually employed upon the sheeting material of the package may also be employed to outline the device contemplated by my invention and the cutout lines 33 permit severance from the sheeting of the package.

In general, it will be observed that I have provided an advertising device made of printed matter which permits a most effective display of advertising matter, while providing an article of utility in the nature of sun goggles or shields.

It will also be observed that my construction, by utilizing limited perforations or slits in the display area, permits the utilization of the maximum advertising or display area, without obliterating this display area. The combined effect is to provide a very efficient and attractive advertising device, in which the display area is available to the maximum degree and the apertures which serve to shield the eyes from glare do not interfere with the impressed advertising subject matter.

Having thus described my invention and illustrated its use, what I claim as new and desire to secure by Letters Patent, is—

1. A combined sun shield and advertising device in the form of a pair of spectacles and comprising portions shaped to simulate lenses made of opaque relatively stiff sheet material, such as paper, cardboard, or the like, the said lenses bearing imprinted advertising matter on their faces in type commensurate with the size of such portions, each lens portion having a narrow slit of a size which does not interfere with or obliterate the printed matter impressed thereon, thereby rendering the printed matter legible to persons observing the wearer.

2. A combined sun shield and advertising device in the form of a pair of spectacles and comprising portions shaped to simulate lenses made of opaque relatively stiff sheet material, such as paper, cardboard, or the like, the said lens portions bearing imprinted advertising matter on their faces in type commensurate with the size of such portions, each lens portion having a narrow horizontal slit of a size which does not interfere with or obliterate the printed matter impressed thereon, thereby rendering the printed matter legible to persons observing the wearer.

3. A combined sun shield and advertising device in the form of a pair of spectacles made of opaque relatively stiff sheet material, such as paper, cardboard, or the like, and comprising portions shaped to simulate lenses, and extensions forming ear engaging riders, the lens portions bearing imprinted advertising matter on their faces in type commensurate with the size of such portions, each lens portion having a narrow slit of a size which does not interfere with or obliterate the printed matter impressed on said simulated lenses, thereby rendering the printed matter legible to persons observing the wearer.

4. A combined sun shield and advertising device in the form of a pair of spectacles and comprising portions shaped to simulate lenses made of opaque relatively stiff sheet material, such as paper, cardboard, or the like, the said lens portions bearing imprinted advertising matter on their faces in type commensurate with the size of such portions, each lens portion having a narrow horizontal slit of a size which does not interfere with or obliterate the printed matter impressed thereon, thereby rendering the printed matter legible to persons observing the wearer, each of the lens portions also having a pair of slots extending upwardly from the ends of said slit, the sheet material between said slots being bent forward to provide visors.

5. A combined sun shield and advertising device in the form of a pair of spectacles made of opaque relatively stiff sheet material, such as paper, cardboard, or the like, and comprising portions shaped to simulate lenses, and extensions forming ear engaging riders, the lens portions bearing imprinted advertising matter on their faces in type commensurate with the size of such portions, each lens portion having a narrow slit of a size which does not interfere with or obliterate the printed matter impressed on said simulated lenses, thereby rendering the printed matter legible to persons observing the wearer, said rider forming extensions being enlarged at their ends adjacent said lens portions, thereby providing extended areas serving as blinders.

6. A carton formed of opaque relatively stiff sheet material, such as paper, cardboard, or the like, said sheet material being perforated or scored in a manner outlining a simulated eyeglass frame and riders, the area within said eyeglass frame being impressed with advertising matter substantially covering the lens defining area of said frame, each of said lens defining areas also having score lines defining a narrow slit of a size which does not interfere with or obliterate the printed matter impressed on said areas, thereby rendering the printed matter legible to persons observing the wearer.

STANLEY J. PHILIPSON.